US009342778B2

(12) United States Patent
Bashan et al.

(10) Patent No.: US 9,342,778 B2
(45) Date of Patent: *May 17, 2016

(54) CONTACTLESS SMART SIM FUNCTIONALITY RETROFIT FOR MOBILE COMMUNICATION DEVICE

(75) Inventors: Oded Bashan, Rosh Pina (IL); Nehemya Itay, Moshav Beit Hillel (IL); Nir Gazit, Misgav (IL); Yaacov Haroosh, Migdal HaEmek (IL)

(73) Assignee: On Track Innovations Ltd., Rosh Pina (IL)

( * ) Notice: Subject to any disclaimer, the term of this patent is extended or adjusted under 35 U.S.C. 154(b) by 144 days.

This patent is subject to a terminal disclaimer.

(21) Appl. No.: 13/991,932

(22) PCT Filed: Nov. 20, 2011

(86) PCT No.: PCT/IL2011/000897
§ 371 (c)(1),
(2), (4) Date: Dec. 26, 2013

(87) PCT Pub. No.: WO2012/077096
PCT Pub. Date: Jun. 14, 2012

(65) Prior Publication Data
US 2014/0117082 A1    May 1, 2014

Related U.S. Application Data (63) Continuation of application No. 12/961,179, filed on Dec. 6, 2010, now Pat. No. 8,424,757.

(51) Int. Cl.
*G06K 19/077* (2006.01)
*H04M 1/02* (2006.01)
(Continued)

(52) U.S. Cl.
CPC ...... *G06K 19/07739* (2013.01); *G06K 19/0727* (2013.01); *G06K 19/07741* (2013.01);
(Continued)

(58) Field of Classification Search
USPC .............................. 235/492, 375, 439; 705/65
See application file for complete search history.

(56) References Cited

U.S. PATENT DOCUMENTS

2003/0213849 A1    11/2003  Luu
2006/0064391 A1*   3/2006   Petrov et al. ................. 705/65
(Continued)

FOREIGN PATENT DOCUMENTS

| CN | 101303746 | 11/2008 |
| CN | 101520836 | 9/2009 |
| EP | 1 914 828 | 5/2008 |
| WO | WO 2010/068016 | 6/2010 |

OTHER PUBLICATIONS

International Search Report of Application No. PCT/IL2011/000897 mailed on Apr. 20, 2012.

*Primary Examiner* — Allyson Trail
(74) *Attorney, Agent, or Firm* — Pearl Cohen Zedek Latzer Baratz LLP (57) ABSTRACT

A contactless transaction adaptor for use with a mobile communicator, including a thin SIM card signal interceptor portion arranged for insertion intermediate an existing SIM card, having SIM card-based contacts, and communicator based SIM card contacts located in a SIM card recess formed in the communicator, the interceptor portion having first contacts for communication with the communicator-based SIM card contacts and second contacts for communication with the SIM card-based contacts, a contactless communication circuit bearing portion arranged for insertion in the communicator, a contactless antenna and a contactless communication circuit both mounted onto the circuit bearing portion, a flexible connector portion interconnecting the interceptor portion and the circuit bearing portion, a first electrical path extending along the connector portion between the contacts of the interceptor portion and the contactless communication circuit, and a second electrical path extending along the circuit bearing portion between the antenna and the contactless communication circuit.

20 Claims, 4 Drawing Sheets (51) Int. Cl.
*H04M 1/725* (2006.01)
*G06K 19/07* (2006.01)
*H04B 1/3816* (2015.01)

(52) U.S. Cl.
CPC ............. *H04B1/3816* (2013.01); *H04M 1/026* (2013.01); *H04M 1/7253* (2013.01); *H04M 1/0262* (2013.01); *H04M 2250/04* (2013.01)

(56) References Cited

U.S. PATENT DOCUMENTS

| | | |
|---|---|---|
| 2008/0076474 A1 | 3/2008 | Ho |
| 2008/0277483 A1 | 11/2008 | Ho |
| 2009/0061933 A1 | 3/2009 | Lo et al. |
| 2009/0069050 A1 | 3/2009 | Jain et al. |
| 2009/0166421 A1 | 7/2009 | Finn |
| 2010/0022273 A1 | 1/2010 | Patrice |

* cited by examiner

FIG. 2

CONTACTLESS SMART SIM FUNCTIONALITY RETROFIT FOR MOBILE COMMUNICATION DEVICE

CROSS-REFERENCE TO RELATED APPLICATIONS

This application is a National Phase Application of PCT International Application No. PCT/IL2011/000897, International Filing Date Nov. 20, 2011, entitled "Contactless Smart SIM Functionality Retrofit for Mobile Communication Device" published on Jun. 14, 2012 as International Publication No. WO 2012/077096, and is a continuation of U.S. patent application Ser. No. 12/961,179, filed Dec. 6, 2010, now U.S. Pat. No. 8,424,757, which are hereby incorporated by reference.

FIELD OF THE INVENTION

The present invention relates to mobile communication devices having contactless smart card functionality generally, and more specifically to retrofit contactless smart SIM functionality assemblies for use with mobile communication devices.

BACKGROUND OF THE INVENTION

The following patent publications and articles are believed to represent the current state of the art:
U.S. Published Patent Application Nos. 2008/0076474 and 2008/0277483;
European Published Patent Application No. 1 914 828;
China Published Patent Application Nos. 101303746 and 101520836;
A press release by Zenius Solutions: "Zenius Solutions enables interactive NFC on current GSM phones", Oct. 19, 2009;
"Bladox Waver" by Bladox® (http://www.bladox.com); and
"KingSub® duoPass® by Taisys (http://www.taisys.com).

SUMMARY OF THE INVENTION

The present invention seeks to provide mobile communication devices having retrofit contactless smart SIM functionality assemblies.

There is thus provided in accordance with a preferred embodiment of the present invention a contactless transaction adaptor for use with a mobile communicator, the adaptor including a thin SIM card signal interceptor portion arranged for insertion intermediate an existing SIM card, having SIM card-based contacts, and mobile communicator based SIM card contacts located in a SIM card recess formed in the mobile communicator, the thin SIM card signal interceptor portion having first contacts for communication with the mobile communicator-based SIM card contacts in the SIM card recess and second contacts for communication with the SIM card-based contacts on the existing SIM card, a contactless communication circuit bearing portion arranged for insertion in the mobile communicator outside of the SIM card recess and adjacent a housing of the mobile communicator, a contactless antenna mounted on the contactless communication circuit bearing portion, a contactless communication circuit mounted onto the contactless communication circuit bearing portion, a flexible connector portion interconnecting the thin SIM card signal interceptor portion and the contactless communication circuit bearing portion, a first electrical path extending along the flexible connector portion between the first and second contacts of the thin SIM card signal interceptor portion and the contactless communication circuit, and a second electrical path extending along the contactless communication circuit bearing portion between the contactless antenna and the contactless communication circuit.

Alternatively, the first electrical path is also a signal path. Alternatively, the second electrical path is also a signal path.

In accordance with a preferred embodiment of the present invention, the contactless transaction adaptor is operative to automatically communicate, via the mobile communicator, with a wireless communications provider which provides wireless communications services to the mobile communicator and to automatically activate the contactless transaction adaptor in operative engagement with the mobile communicator. Additionally, the contactless transaction adaptor is operable as a contactless payment device.

Preferably, the wireless communications provider is operative to record details of transactions executed by a user of the mobile communicator via the contactless transaction adaptor. Preferably, the details include at least one of a sum, a date, identification information of a user of the mobile communicator and a recipient of the sum. Preferably, the wireless communications provider is operative to transfer at least part of the sum from an account associated with the user of the mobile communicator to an account associated with the recipient.

In accordance with a preferred embodiment of the present invention, the second contacts protrude from the thin SIM card signal interceptor, thereby providing for improved electrical contact between the second contacts and the SIM card-based contacts.

Preferably, the contactless antenna is a loop antenna. Preferably, the contactless communication circuit includes an integrated circuit.

In accordance with a preferred embodiment of the present invention, the contactless communication circuit bearing portion is formed of a flexible PCB substrate. Preferably, the PCB substrate is Polyamide. Alternatively, the PCB substrate is Polystyrene. Preferably, the contactless communication circuit bearing portion also includes a layer of paramagnetic material which is operative to reduce magnetic coupling between the antenna and a battery of the mobile communicator. Preferably, the paramagnetic material is ferrite.

In accordance with a preferred embodiment of the present invention, the flexible connector portion is formed of a flexible PCB substrate. Preferably, the PCB substrate is Polyamide. Alternatively, the PCB substrate is Polystyrene.

There is also provided in accordance with another preferred embodiment of the present invention a transaction device including a mobile communicator and a retrofit contactless transaction adaptor, the adaptor including a thin SIM card signal interceptor portion inserted intermediate an existing SIM card, having SIM card-based contacts, and mobile communicator based SIM card contacts located in a SIM card recess formed in the mobile communicator, the thin. SIM card signal interceptor having first contacts for communication with the mobile communicator-based SIM card contacts in the SIM card recess and second contacts for communication with the SIM card-based contacts on the existing SIM card, a contactless communication circuit bearing portion inserted in the mobile communicator outside of the SIM card recess and adjacent a housing of the mobile communicator, a contactless antenna mounted on the contactless communication circuit bearing portion, a contactless communication circuit mounted onto the contactless communication circuit bearing portion, a flexible connector portion interconnecting the thin SIM card signal interceptor portion and the contactless communication circuit bearing portion, a first electrical path extending along the flexible connector portion between the first and second contacts of the thin SIM card signal interceptor portion and the contactless communication circuit, and a second electrical path extending along the contactless communication circuit portion between the contactless antenna and the contactless communication circuit.

Alternatively, the first electrical path is also a signal path. Alternatively, the second electrical path is also a signal path.

In accordance with a preferred embodiment of the present invention, the retrofit contactless transaction adaptor is operative to automatically communicate, via the mobile communicator, with a wireless communications provider which provides wireless communications services to the mobile communicator and to automatically activate the contactless transaction adaptor in operative engagement with the mobile communicator.

Preferably, the wireless communications provider is operative to record details of transactions executed by a user of the transaction device. Preferably, the details include at least one of a sum, a date, identification information of a user of the transaction device and a recipient of the sum. Preferably, the wireless communications provider is operative to transfer at least part of the sum from an account associated with the user of the transaction device to an account associated with the recipient.

In accordance with a preferred embodiment of the present invention, the second contacts protrude from the thin SIM card signal interceptor, thereby providing for improved electrical contact between the second contacts and the SIM card-based contacts.

Preferably, the contactless antenna is a loop antenna. Preferably, the contactless communication circuit includes an integrated circuit.

In accordance with a preferred embodiment of the present invention, the contactless communication circuit bearing portion is formed of a flexible PCB substrate. Preferably, the PCB substrate is Polyamide. Alternatively, the PCB substrate is Polystyrene. Preferably, the contactless communication circuit bearing portion also includes a layer of paramagnetic material which is operative to reduce magnetic coupling between the antenna and a battery of the mobile communicator. Preferably, the paramagnetic material is ferrite.

In accordance with a preferred embodiment of the present invention, the flexible connector portion is formed of a flexible PCB substrate. Preferably, the PCB substrate is Polyamide. Alternatively, the PCB substrate is Polystyrene.

There is further provided in accordance with yet another preferred embodiment of the present invention a method of effecting transactions including providing a transaction device including a mobile communicator and a retrofit contactless transaction adaptor, the adaptor including a thin SIM card signal interceptor portion inserted intermediate an existing SIM card, having SIM card-based contacts, and mobile communicator based SIM card contacts located in a SIM card recess formed in the mobile communicator, the thin SIM card signal interceptor having first contacts for communication with the mobile communicator-based SIM card contacts in the SIM card recess and second contacts for communication with the SIM card-based contacts on the existing SIM card, a contactless communication circuit bearing portion inserted in the mobile communicator outside of the SIM card recess and adjacent a housing of the mobile communicator, a contactless antenna mounted on the contactless communication circuit bearing portion, a contactless communication circuit mounted onto the contactless communication circuit bearing portion, a flexible connector portion interconnecting the thin SIM card signal interceptor portion and the contactless communication circuit bearing portion, a first electrical path extending along the flexible connector portion between the first and second contacts of the thin SIM card signal interceptor portion and the contactless communication circuit, a second electrical path extending along the contactless communication circuit bearing portion between the contactless antenna and the contactless communication circuit, and operating the mobile communicator in a contactless transaction mode for effecting a transaction.

In accordance with a preferred embodiment of the present invention, the method also includes initially activating contactless transaction functionality following insertion of the retrofit contactless transaction adaptor in operative engagement with the mobile communicator. Preferably, the initially activating is effected without user initiation.

Alternatively, the first electrical path is also a signal path. Alternatively, the second electrical path is also a signal path.

Preferably, the method includes employing a wireless communications provider associated with the mobile communicator to record details of the transactions. Preferably, the details include at least one of a sum, a date, user of the transaction device and a recipient of the sum. Preferably, the method includes employing the wireless communications provider to transfer at least part of the sum from an account associated with the user of the transaction device to an account associated with the recipient.

In accordance with a preferred embodiment of the present invention, the second contacts protrude from the thin SIM card signal interceptor, thereby providing for improved electrical contact between the second contacts and the SIM card-based contacts.

Preferably, the contactless antenna is a loop antenna. Preferably, the contactless communication circuit includes an integrated circuit.

In accordance with a preferred embodiment of the present invention, the contactless communication circuit bearing portion is formed of a flexible PCB substrate. Preferably, the PCB substrate is Polyamide. Alternatively, the PCB substrate is Polystyrene. Preferably, the contactless communication circuit bearing portion also includes a layer of paramagnetic material which is operative to reduce magnetic coupling between the antenna and a battery of the mobile communicator. Preferably, the paramagnetic material is ferrite.

In accordance with a preferred embodiment of the present invention, the flexible connector portion is formed of a flexible PCB substrate. Preferably, the PCB substrate is Polyamide. Alternatively, the PCB substrate is Polystyrene.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
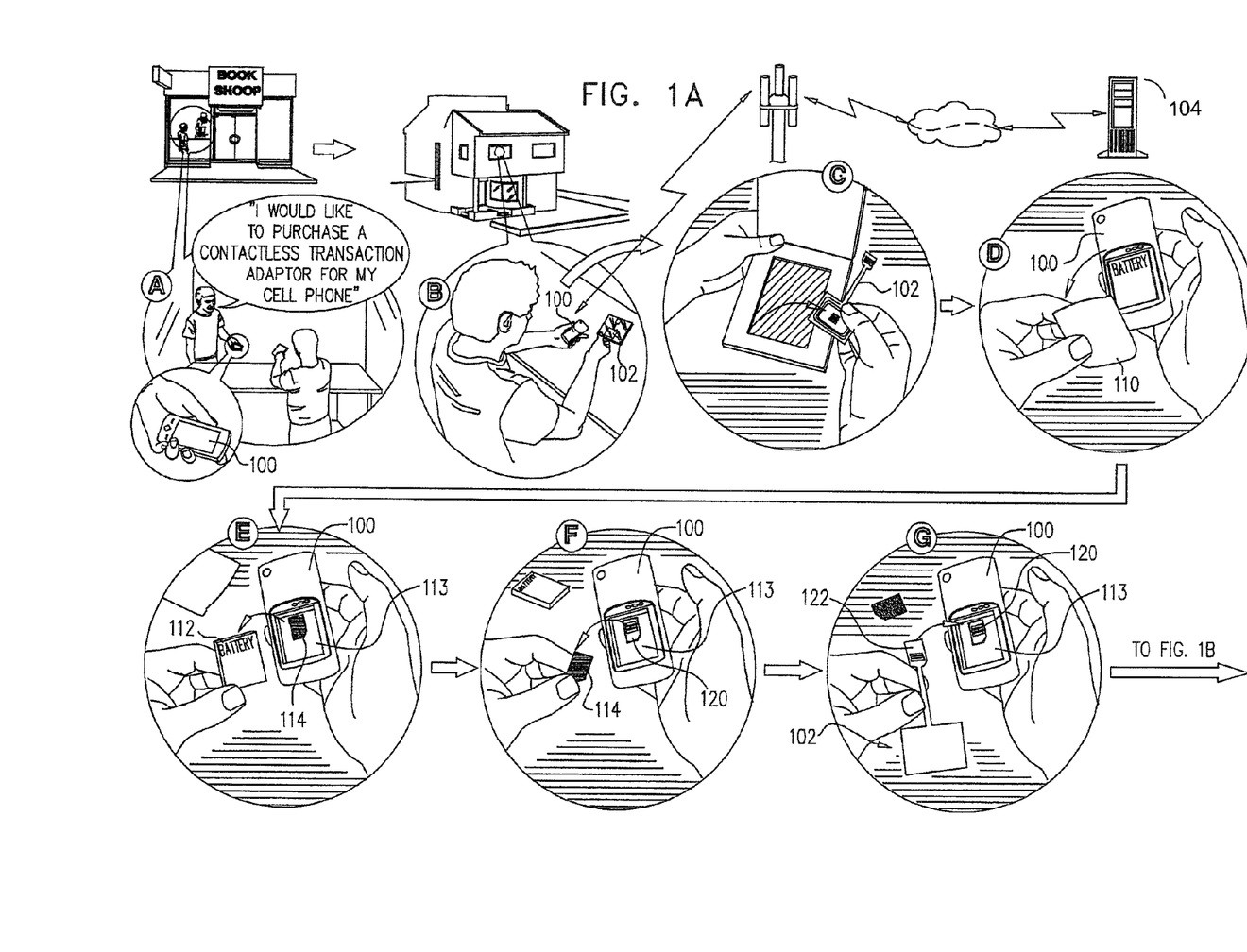
FIGS. 1A and 1B are together a simplified pictorial illustration of steps in the installation and initialization of a contactless transaction adaptor in a mobile communication device, constructed and operative in accordance with an embodiment of the present invention.
Figure 1B:
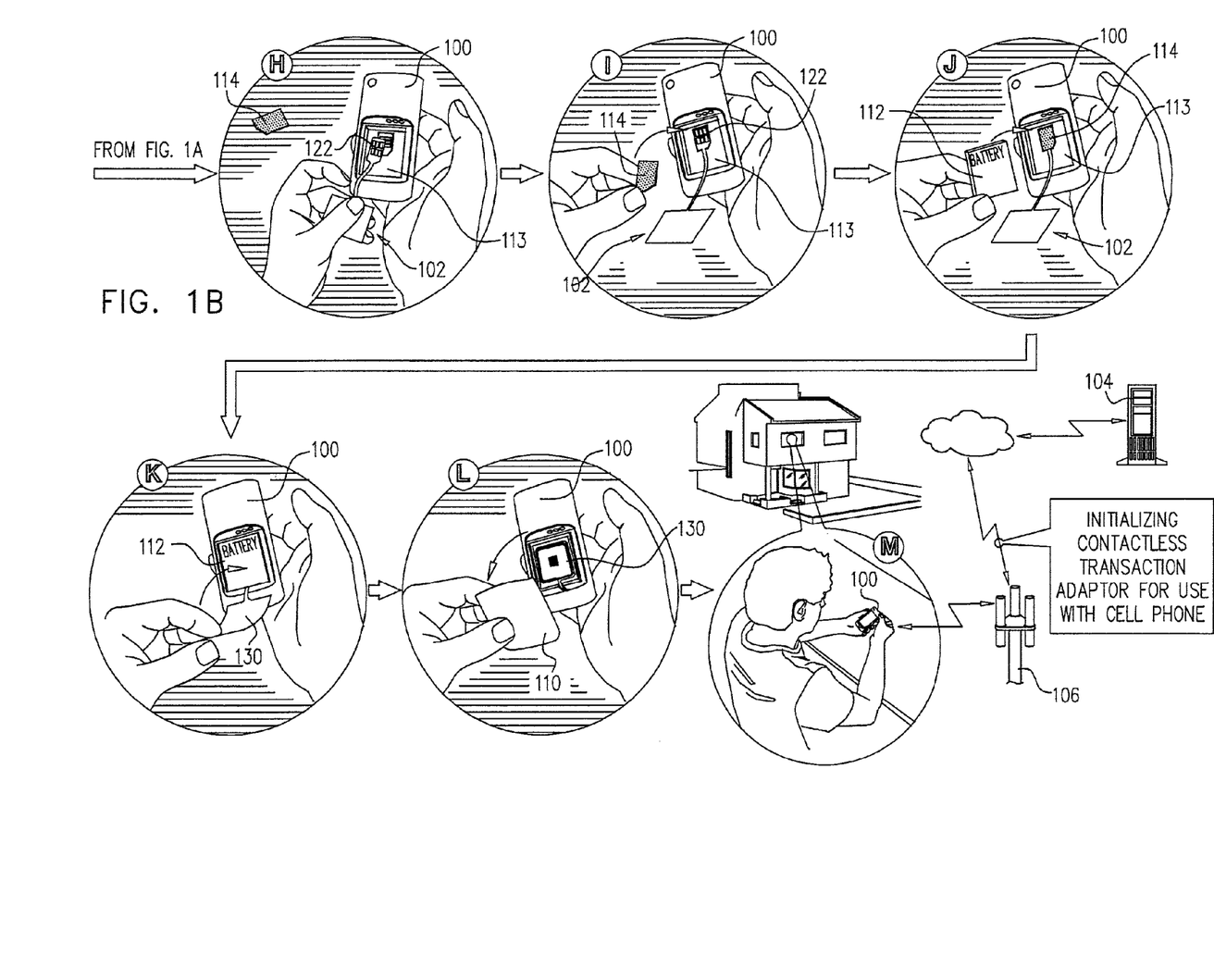

Reference is now made to FIGS. 1A and 1B, which are together a simplified pictorial illustration of steps in the installation and initialization of a contactless transaction adaptor in a mobile communication device, constructed and operative in accordance with an embodiment of the present invention.

As seen in FIGS. 1A and 1B, a user of a mobile communication device 100 purchases a contactless transaction adaptor 102 for use with the mobile communication device 100 which communicates with a wireless communications provider 104 via at least one antenna 106. The contactless transaction adaptor 102 preferably includes a thin SIM card signal interceptor portion arranged for insertion intermediate an existing SIM card, having SIM card-based contacts, and mobile communicator based SIM card contacts located in a SIM card recess formed in the mobile communicator. The thin SIM card signal interceptor portion includes first contacts for communication with the mobile communicator-based SIM card contacts in the SIM card recess and second contacts for communication with the SIM card-based contacts on the existing SIM card.

Contactless transaction adaptor 102 also preferably includes a contactless communication circuit bearing portion arranged for insertion in the mobile communicator outside of the SIM card recess and adjacent a housing of the mobile communicator, a contactless antenna mounted on the contactless communication circuit bearing portion, a contactless communication circuit mounted onto the contactless communication circuit bearing portion and a flexible connector portion interconnecting the thin SIM card signal interceptor portion and the contactless communication circuit bearing portion.

A first electrical path extends along the flexible connector portion between the first and second contacts of the thin SIM card signal interceptor portion and the contactless communication circuit. A second electrical path extends along the contactless communication circuit bearing portion between the contactless antenna and the contactless communication circuit. It is appreciated that either or both of the first and second paths may be signal paths.

To install the contactless transaction adaptor 102 in the communication device 100, the user of communication device 100 typically first removes at least part of a housing 110 of communication device 100 as shown in enlargement D FIG. 1A, and then, as shown in enlargement E of FIG. 1A, typically removes the battery 112 of communication device 100 from a battery recess 113 to access SIM card 114 installed in communication device 100. Typically, SIM card 114 is located beneath battery 112. However, it is appreciated that SIM card 114 may be located in different locations and orientations in various models and types of mobile communicators. The present invention is not limited to any given model or type of mobile communicator.

As shown in enlargement F of FIG. 1A, the user of communication device 100 removes the SIM card 114 from SIM card recess 120 of device 100. As shown in enlargement G, a thin SIM card signal interceptor portion 122 of the contactless transaction adaptor 102 is preferably formed in the shape of SIM card recess 120 of device 100 and includes contacts for communication with the mobile communicator-based SIM card contacts in the SIM card recess 120.

Turning now to FIG. 1B, as shown in enlargement H, the user of communication device 100 inserts SIM card signal interceptor portion 122 into SIM card recess 120. Thereafter, as shown in enlargement I, the user of communication device 100 reinserts SIM card 114 over SIM card signal interceptor portion 122, which interceptor portion 122 also includes contacts for communication with the SIM card-based contacts on SIM card 114.

Upon reinserting SIM card 114, the user of communication device 100 reinserts battery 112 into battery recess 113, as shown in enlargement J. As shown in enlargement K, user of communication device 100 then folds a contactless communication circuit bearing portion 130 of contactless transaction adaptor 102 onto to a rearward facing surface of battery 112. Thereafter, as shown in enlargement L, user of communication device 100 replaces the at least part of a housing 110 to seal the device 100.

As shown in enlargement M, upon turning on device 100, contactless transaction adaptor 102 contacts wireless communications provider 104 via at least one antenna 106 and automatically activates contactless transaction adaptor 102 in operative engagement with device 100.

Figure 2:
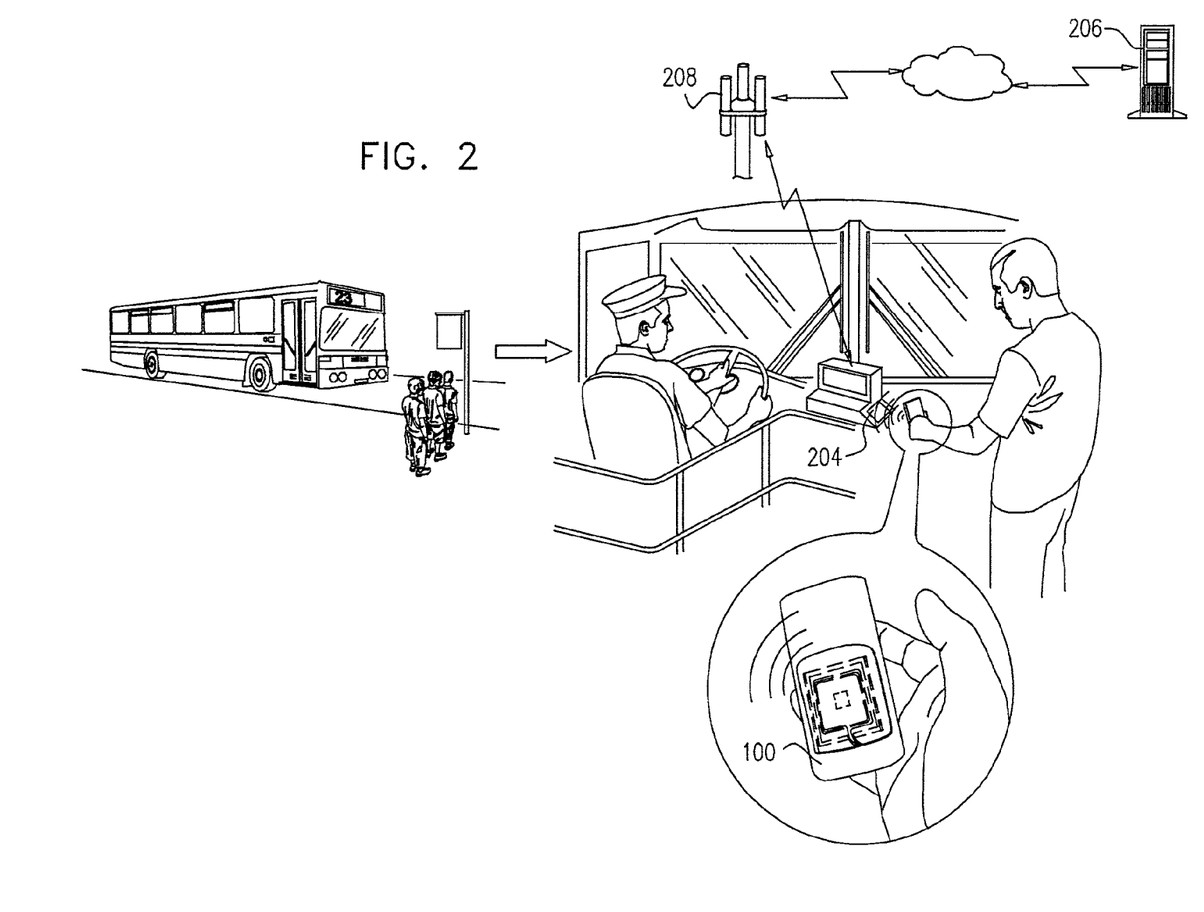
FIG. 2 is a simplified pictorial illustration of the use of the contactless transaction adaptor of FIG. 1 as a payment device.

Reference is now made to FIG. 2, which is a simplified pictorial illustration of the use of the contactless transaction adaptor of FIG. 1 as a payment device. As shown in FIG. 2, a user of a communication device 100 including a contactless transaction adaptor 202 which has been previously initialized as described with regard to FIG. 1B, uses device 100 as a transaction device to perform a transaction such as paying for public transportation. Upon holding device 100 in proximity to a contactless transaction reader 204, communication is established between device 100 and a wireless communications provider 206 via contactless transaction adaptor 202, reader 204 and at least one antenna 208. Communications provider 206 preferably records details of the transaction such as identification and account details associated with device 100 the sum being paid, and identification and account details associated with reader 204. At a later time, communications provider 206 collects the sum from the user of device 100 and transfers at least part of the sum to an operator of reader 204.

Figure 3A:
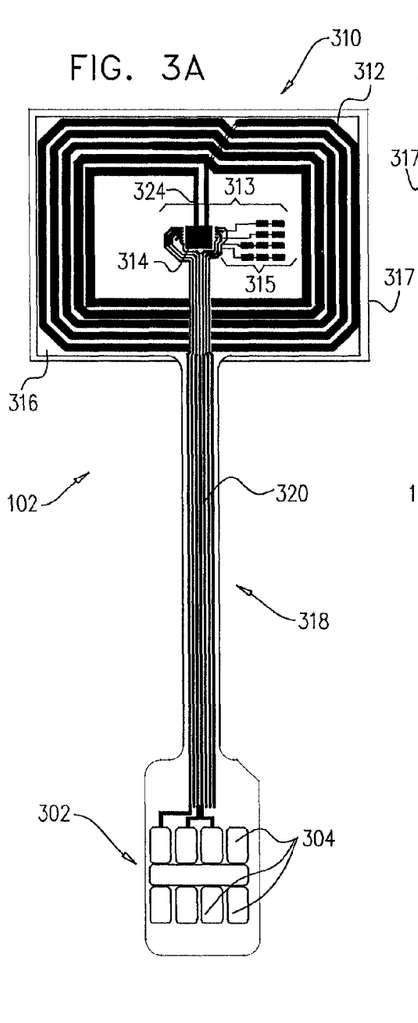
FIGS. 3A and 3B are simplified illustrations of the contactless transaction adaptor of FIG. 1, taken in respective forward facing and rearward facing directions.
Figure 3B:
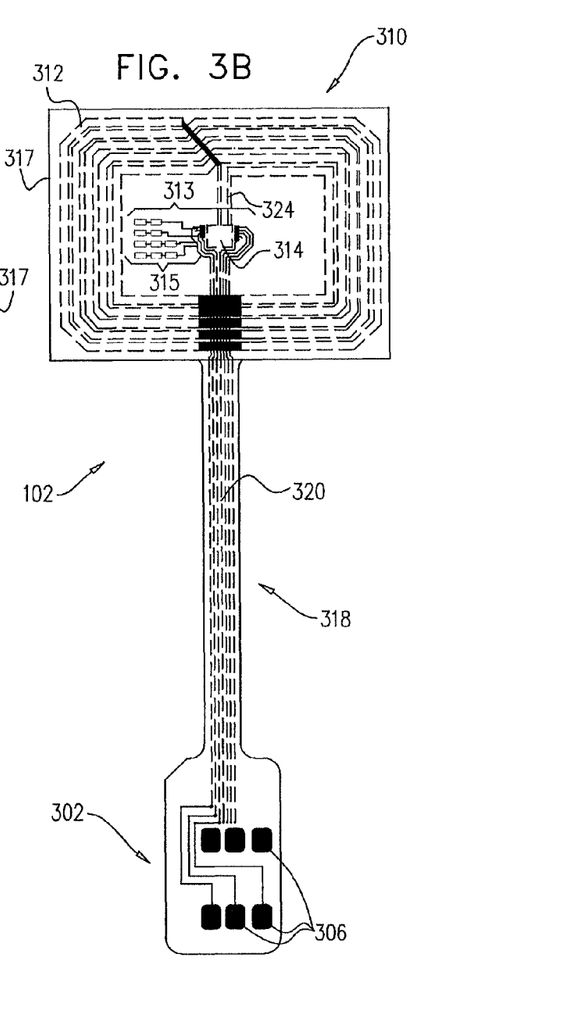

Reference is now made to FIGS. 3A and 3B, which are simplified illustrations of the contactless transaction adaptor of FIG. 1, taken in respective forward facing and rearward facing directions. As shown in FIGS. 3A and 3B, the contactless transaction adaptor 102 preferably includes a thin SIM card signal interceptor portion 302 arranged for insertion into a mobile communication device intermediate an existing SIM card, having a multiplicity of SIM card-based contacts, and mobile communicator based SIM card contacts located in a SIM card recess formed in the mobile communicator.

As seen in FIGS. 3A & 3B, the thin SIM card signal interceptor portion 302 includes first contacts 304 disposed on a forward face of portion 302 for communication with the mobile communicator-based SIM card contacts in the SIM card recess, and second contacts 306 disposed on a rearward face of portion 302 for communication with the SIM card-based contacts on the existing SIM card. It is appreciated that second contacts 306 may protrude from rearward face of portion 302, thereby providing for improved electrical contact between second contacts 306 and SIM card-based contacts on the existing SIM card.

Contactless transaction adaptor 102 also preferably includes a contactless communication circuit bearing portion 310 arranged for insertion into the mobile communicator outside of the SIM card recess and adjacent to a housing of the mobile communicator. As shown in FIG. 3A, an antenna 312, preferably formed as a contactless loop antenna, and a contactless communication circuit 313 are mounted onto the forward face of contactless communication circuit bearing portion 310. Contactless communication circuit 313 preferably comprises an integrated circuit 314 and several electronic components 315. In alternative embodiments of the present invention, either or both of antenna 312 and contactless communication circuit 313 may be formed on the rearward face of contactless communication circuit bearing portion 310.

Antenna 312 is preferably formed by conventional antenna forming techniques on a conventional flexible PCB substrate 316, such as Polyamide or Polystyrene. A layer of paramagnetic material 317, such as ferrite, is preferably adhered to substrate 316, thereby reducing magnetic coupling between antenna 312 and the battery of the mobile communication device.

As shown in FIGS. 3A and 3B, a flexible connector portion 318 interconnects the thin SIM card signal interceptor portion 302 and the contactless communication circuit bearing portion 310. Flexible connector portion 318 is preferably formed of a conventional flexible PCB substrate, such as Polyamide or Polystyrene.

As shown in FIGS. 3A and 3B, a first electrical path 320 extends along the forward face of flexible connector portion 318 between the first and second contacts 304 and 306 of the thin SIM card signal interceptor portion 302, and the contactless communication circuit 313. Additionally or alternatively, an electrical path may extend along the rearward face of flexible connector portion 318 between either or both of the first and second contacts 304 and 306 and the contactless communication circuit 313. It is appreciated that the first electrical path 320 may connect between contacts on either face of portion 302 and contactless communication circuit 313 via one or more apertures formed in adaptor 102.

As shown in FIG. 3A, a second electrical path 324 extends along the contactless communication circuit bearing portion 310 between antenna 312 and the contactless communication circuit 313.

It will be appreciated by persons skilled in the art that the present invention is not limited by what has been particularly shown and described hereinabove. Rather the scope of the present invention includes combinations and subcombinations of various features described hereinabove as well as variations and modifications thereof which would occur to persons reading the foregoing and which are not in the prior art.

The invention claimed is:

1. A device comprising:
   a SIM card signal interceptor portion arranged for insertion between a SIM card and a mobile communicator, said SIM card signal interceptor portion having first contacts for communication with contacts in a SIM card recess of said mobile communicator and second contacts for communication with contacts of said SIM card;
   a contactless communication circuit bearing portion arranged for insertion in said mobile communicator;
   a contactless communication circuit and a contactless antenna mounted onto said contactless communication circuit bearing portion;
   a flexible connector portion interconnecting said SIM card signal interceptor portion and said contactless communication circuit bearing portion;
   a first electrical path extending between said first and second contacts of said SIM card signal interceptor portion and said contactless communication circuit; and
   a second electrical path extending between said contactless antenna and said contactless communication circuit.

2. The device of claim 1 wherein said first electrical path is also a signal path.

3. The device of claim 1 wherein said second electrical path is also a signal path.

4. The device of claim 1 wherein said device is configured to communicate, via said mobile communicator, with a wireless communications provider which provides wireless communications services to said mobile communicator.

5. The device of claim 1 wherein said device is operable as a contactless payment device.

6. The device of claim 5 wherein said contactless communication circuit is configured to communicate to said wireless communications provider details of transactions executed by a user of said mobile communicator via said device.

7. The device of claim 6 wherein said details include at least one of a sum, a date, identification information of a user of said mobile communicator and a recipient of said sum.

8. The device of claim 1 wherein the flexible connector portion is foldable.

9. The device of claim 8 wherein the flexible connector portion is foldable to enable the contactless communication circuit bearing portion and the SIM card signal interceptor portion to be positioned adjacent opposite surfaces of a battery of said mobile communicator.

10. The device of claim 8 wherein with the flexible connector in an unfolded configuration the first contacts are disposed on a forward face of the SIM card signal interceptor portion and the antenna is mounted on a forward face of the contactless communication circuit bearing portion.

11. A transaction device comprising:
    a mobile communicator having a SIM card recess formed therein; and
    an adaptor comprising:
    a SIM card signal interceptor portion configured to be inserted between a SIM card and said mobile communicator, said SIM card signal interceptor having first contacts for communication with contacts in said SIM card recess and second contacts for communication with contacts of a SIM card;
    contactless communication circuit bearing portion inserted in said mobile communicator and having a contactless antenna and a contactless communication circuit mounted thereon;
    a flexible connector portion interconnecting said SIM card signal interceptor portion and said contactless communication circuit bearing portion;
    a first electrical path extending between said first and second contacts of said SIM card signal interceptor portion and said contactless communication circuit; and
    a second electrical path extending between said contactless antenna and said contactless communication circuit.

12. The transaction device according to claim 11 wherein said first electrical path is also a signal path.

13. The transaction device according to claim 11 wherein said second electrical path is also a signal path.

14. The transaction device according to claim 11 wherein said contactless communication circuit is configured to communicate, via said mobile communicator, with a wireless communications provider which provides wireless communications services to said mobile communicator.

15. The transaction device according to claim 14 wherein said contactless communication circuit is configured to send to said wireless communications provider details of transactions executed by a user of said transaction device.

16. The transaction device according to claim 15 wherein said details include at least one of a sum, a date, identification information of a user of said transaction device and a recipient of said sum.

17. A method of effecting transactions comprising:
- inserting into a mobile communicator having a SIM card recess an adaptor comprising a SIM card signal interceptor portion, a contactless communication circuit bearing portion having mounted thereon a contactless communication circuit and a contactless antenna, and a flexible connector portion interconnecting said SIM card signal interceptor portion and said contactless communication circuit bearing portion, wherein said inserting comprising positioning said SIM card signal interceptor portion such that first contacts of said SIM card interceptor portion communicate with contacts in said SIM card recess;
- inserting a SIM card into said SIM card recess such that second contacts of said SIM card interceptor portion communicate with contacts of said SIM card; and
- folding the flexible connector portion to bring the contactless communication circuit bearing portion onto to a rearward facing surface of a battery, wherein said mobile communicator effects a contactless transaction when placed in proximity to a contactless transaction reader.

18. The method of effecting transactions according to claim 17 comprising: initially activating contactless transaction functionality following insertion of said adaptor in operative engagement with said mobile communicator.

19. The method of effecting transactions according to claim 18 wherein said initially activating is effected without user initiation.

20. The method of effecting transactions according to claim 17 wherein said method comprises communicating details of said transactions to a wireless communications provider associated with said mobile communicator.

* * * * *